July 12, 1938.　　　　　B. F. WRIGHT　　　　　2,123,349
VEHICLE CONTROL APPARATUS
Filed Dec. 17, 1930
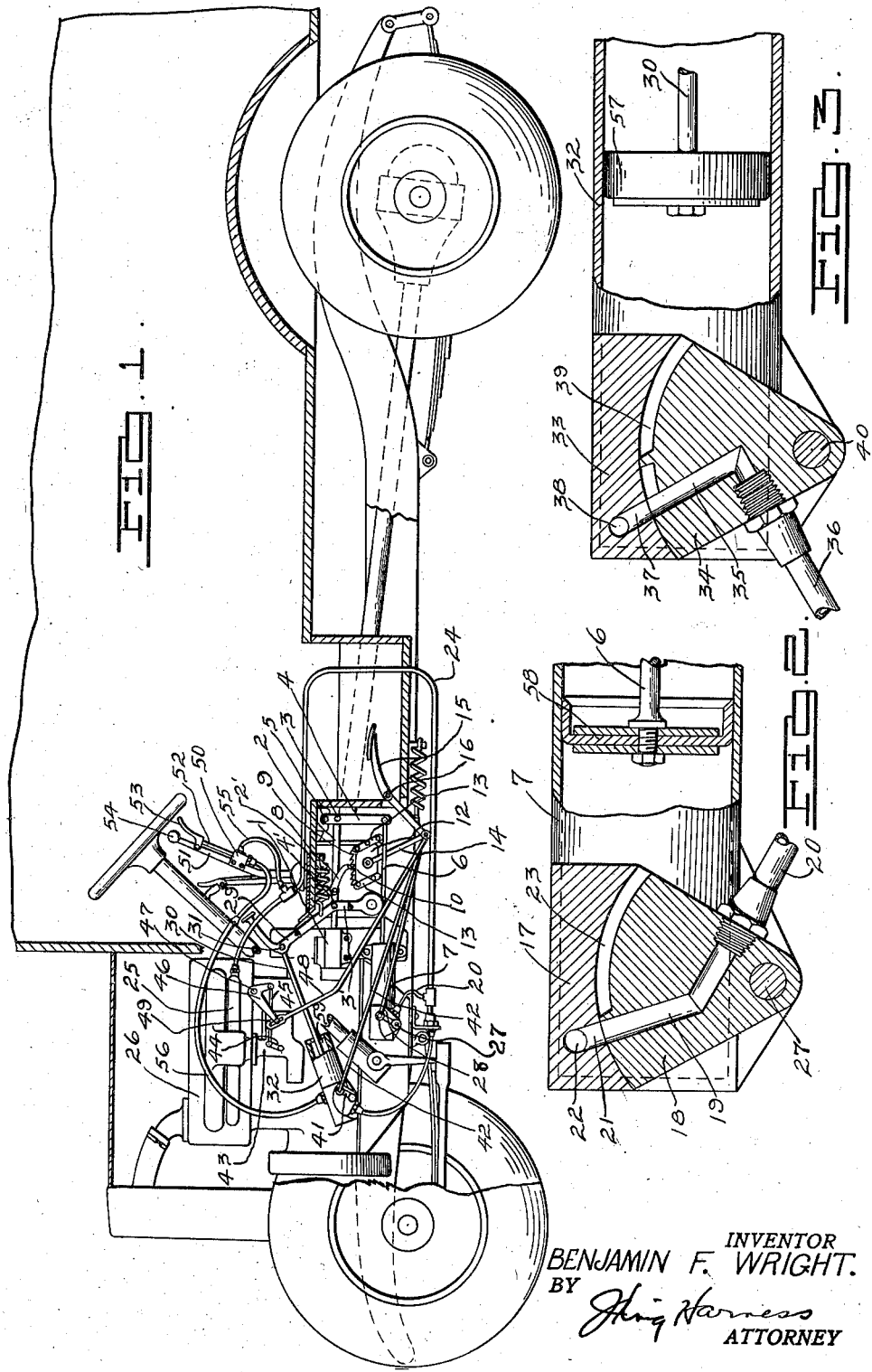
INVENTOR
BENJAMIN F. WRIGHT.
BY
ATTORNEY Patented July 12, 1938

2,123,349

UNITED STATES PATENT OFFICE 2,123,349

VEHICLE CONTROL APPARATUS

Benjamin F. Wright, Detroit, Mich., assignor to Chrysler Corporation, Detroit, Mich., a corporation of Delaware Application December 17, 1930, Serial No. 503,036

17 Claims. (Cl. 192—.01)

This invention relates to improved control apparatus for motor vehicles, particularly for trucks of the type which are frequently stopped and started in making door to door deliveries. When it is necessary for a truck operator to enter and leave a vehicle frequently, as for example in making deliveries at houses in close proximity of each other, much time is wasted and energy unnecessarily consumed by the operator in seating himself properly in order to drive the vehicle, remaining seated while the vehicle is stopped and in rising thereafter. Conventional control apparatus requires the employment of both feet and therefore will not allow the driver to remain standing at the wheel of a vehicle during short trips between close stops and usually both of his hands are occupied, one in shifting gears and the other in steering, so that he is unable to reach into the storage compartment of the vehicle and arrange or obtain a purchase on the articles which are to be delivered during movement of the vehicle, in any event the driver is not free to leave the vehicle until it comes to a complete stop.

The main objects of this invention are to provide improved control apparatus for vehicles in which the brake clutch and accelerator is operable by a single foot pedal; to provide control apparatus of this kind which progressively operates the clutch, brake and accelerator in a predetermined sequence; and to provide control apparatus of this character which is energized by the manifold vacuum of the engine of the vehicle.

Further objects of the invention are to provide improved control apparatus that is conveniently operable while the driver is in a standing position; to provide means for automatically applying the brake and disengaging the clutch upon releasing of a pedal so that the operator may leave the vehicle while it is still in motion and allow it to come to rest under the action of the automatic brake and clutch actuating mechanisms; to provide apparatus of this character which positively holds the brake in an applied condition independently of the manifold vacuum when the operating member is released so as to safely permit the transmission to remain in gear while the operator is absent; to provide an auxiliary control mechanism for the clutch of a vehicle which has an operating member located on the gear shift lever where it is adapted to be manipulated simultaneously with the latter by one hand of the operator.

An illustrative embodiment of the invention is shown in the accompanying drawing, in which:

Fig. 1 is a longitudinal vertical section of a vehicle which is equipped with my improved control apparatus.

Fig. 2 is a fragmentary section of a brake actuating unit.

Fig. 3 is a fragmentary section of a clutch actuating unit.

In the form shown, my improved control apparatus is illustrated in connection with a vehicle of standard construction having conventional clutch and brake mechanisms, the brake mechanism being of hydraulic type and including a master cylinder 1 or other suitable operating means. Extending rearwardly from the master cylinder 1 is an elongated piston rod 2 which is pivoted at 3 to a depending lever 4 that is pivotally supported at 5 upon the floor structure of the vehicle. The lower end of the lever 4 is pivotally attached to a piston rod 6 which extends forwardly into a brake operating cylinder 7 that is mounted on the flywheel casing of the vehicle. The piston rod 2 is pivotally connected at 4' to a brake pedal 3' of conventional construction which is provided with a return spring 2'. The piston rod 2 of the master cylinder 1 carries a pivotally mounted dog 8 which registers with a toothed plate 9 or other suitable means for releasably holding the piston rod 2 in a forward position. The dog 8 has a laterally extending pin 10 which protrudes into the path of a block 12 that is slidably mounted between guide members 13 for lifting the lower end of the dog 8 out of engagement with the toothed plate 9 when desired. A link 14 pivotally connects the slidable block 12 with the lower end of an operating member or pedal 15 having its intermediate portion pivoted at 16 to the floor structure of the vehicle.

Provided on the forward end of the brake actuating cylinder 7 is a valve 17 including a rotatable sector 18 having a passage 19 which communicates at one end with a flexible tube 20. The other end of the passage is adapted to register with a passage 21 formed in the stationary part of the valve 17 which communicates through a port 22 with the interior of the cylinder 7. A recess 23 is formed in the periphery of the rotatable sector 18 for connecting the passage 21 with the atmosphere so as to admit air under atmospheric pressure to the interior of the cylinder 7 when desired. The flexible tube 20 is a branch of a main pipe or tube 24 which is connected at one end with the interior of the intake manifold 25 of the vehicle engine 26. Rigidly attached to a shaft 27 on which the sector 18 is mounted is a lever 55 which is connected by a link 28 to the lower end of the pedal 15.

The clutch mechanism of the vehicle includes a conventional clutch pedal 29 to which a piston rod 30 is pivoted at 31. The piston rod 30 extends into a clutch actuating cylinder 32, shown in section in Fig. 3, which is pivotally mounted on the side of the crank case of the engine. The clutch actuating cylinder 32 has a valve 33 which includes a rotatable sector 34 having a passage 35 communicating at one end with a flexible branch tube 36 which is also connected with the main tube 24 of the apparatus. The passage 35 is adapted to register with a passage 37, in the stationary portion of the valve 33, which leads from a port 38 that communicates with the interior of the cylinder 32. Formed on the periphery of the sector 34 is a narrow, substantially restricted recess 39 through which air under atmospheric pressure is admitted to the interior of the cylinder 32. The passage 35 has an elongated extremity by which it is retained in communication with the passage 37 during the initial rotation of both sectors of the valves 17 and 33, and as a result air under atmospheric pressure is admitted to the cylinder 17 before the vacuum of the cylinder 33 is dissipated. Rigidly mounted on a shaft 40 on which the sector 34 is supported is a lever or arm 41 that is pivotally connected to the pedal 15 by a link 42.

The engine 26 of the vehicle includes a carburetor 43 having conventional throttle valve operating mechanism 44. A rod 45 of the throttle controlling mechanism is pivotally attached to one arm of a bell crank lever 46 which is pivotally mounted at 47 on the block of the engine 26. The other arm of the lever is pivotally and slidably connected to an accelerator rod 48 having a slot 49 for receiving a pin on the end of a bell crank arm. The rod 48 is also pivotally attached to the lower extremity of the pedal 15.

An auxiliary manual control is provided for operating the clutch actuating member independently of the brake and accelerator operating apparatus. This auxiliary control includes a valve 50, mounted on the gear shift lever 51 of the transmission of the vehicle, having a valve stem 52 which is operable by a grip-type operating lever 53 located in close proximity to the knob 54 of the gear shift lever so as to be capable of manipulation simultaneously with the gear shift lever by a single hand of the operator. The valve 50 is connected by a flexible tube 55 to the main vacuum pipe 24 of the system and to the clutch actuating cylinder 32 by another flexible tube 56. When the valve 50 is opened, air is removed from the cylinder 32 by the vacuum of the intake manifold 25 faster than it is admitted to the cylinder 32 by the recess 39 which is comparatively narrow in the direction normal to the plane of the section shown in Fig. 3, and the piston 57 on the inner end of the piston rod 30 is drawn inwardly rotating the clutch pedal 29 to a disengaged position so as to permit shifting of the gears independently of the setting of the brake and accelerator control apparatus.

In operation, when the engine is running and the operator allows the pedal 15 to move to its uppermost position by releasing it in order to depart from the vehicle, the valve 17 of the brake actuating cylinder 7 and the valve 33 of the clutch actuating cylinder 32 are seated in the position shown in Figs. 2 and 3, respectively, the interiors of the cylinders being in communication with the intake manifold 25 of the engine. The suction of the engine holds the pistons 57 and 58 of the cylinders 32 and 7, respectively in their innermost positions, thereby holding the brake pedal 3' in an applied position and holding the clutch pedal 29 in a clutch disengaging position. The throttle of the carburetor 43 is allowed to assume an idling position when the pedal 15 is fully released. With this setting of the control apparatus, the transmission of the vehicle may be left in any desired gear, preferably first or second speed positions. The dog 8 engages the toothed plate 9 when the inner end of the pedal 15 is in its uppermost position so as to lock the brakes mechanically, independently of the manifold suction and to prevent them from being released in the event that the engine ceases to operate.

The initial depression of the upper end of the pedal 15 shifts the block 12 upwardly and disengages the dog 8 from the toothed plate 9 and simultaneously rotates the sector 18 of the valve 17 on the brake actuating cylinder 7 in a counterclockwise direction bringing the passage 21 of the stationary part of the valve into registration with the recess 23 of the sector 18, thus admitting atmospheric pressure to the interior of the brake actuating cylinder. This action releases the piston 58 of the latter cylinder and allows the brake pedal 3' to be returned to a released position so as to discontinue application of the brakes. During the initial depression of the pedal 15, the passage 37 in the stationary part of the valve 33 on the clutch actuating cylinder 32 remains in registration with the elongated end of the passage 35 in the rotatable sector 34 and maintains a subatmospheric condition in the cylinder 32 which holds the clutch of the vehicle in a disengaged condition.

Further depression of the pedal 15 brings the recess 39 of the rotatable sector 34 in the clutch valve 33 into registration with the passage 37 thereof, permitting air from the atmosphere to enter the cylinder 32. This action releases the piston 57 in the cylinder 32 and permits the clutch pedal 29 to move to a clutch engaging position. The return movement of the clutch pedal is governed by the escapement of air through an orifice 59 in the closed upper end of the cylinder 32 which produces a dashpot action. The vehicle begins to move as the clutch is engaged. During the above stages of depression of the pedal 15, the accelerator bar 48 is allowed to move relative to the throttle actuating bell crank 46 by reason of the elongated slot 49 in its upper end, but upon further depression of the pedal 15, the rod 48 opens the throttle and speeds up the engine.

The vehicle may be driven to the next stop without changing the setting of the gears in the transmission, if desired, and upon fully releasing the pedal, the brakes will be applied and the clutch disengaged while the throttle is returned to an idling position, all automatically. If, however, the vehicle is to be driven for a considerable distance, a change in the gear setting may be made in one of two ways. The driver may allow the pedal 15 to partly return and hold it in the position which places the passages 19 and 21 of the valve of the brake actuating cylinder out of registration. This corresponds to the setting of the control apparatus after the initial depression of the pedal 15. The clutch is thus disengaged without applying the brakes and the gear shift lever may be moved to any selected position. Then further depression of the pedal 15 engages the clutch and opens the throttle.

The clutch may also be disengaged without applying the brakes of the vehicle by simultaneously gripping the operating lever 53 and the gear shift lever so as to open the valve 50 on the latter which forms a communication between the interior of the clutch actuating cylinder 32 and the intake manifold 25. The suction of the manifold causes the clutch pedal 29 to be moved to a clutch disengaging position and while the lever 53 is gripped, the gear shift lever 51 may be conveniently moved to any desired position by a single hand of the operator.

In starting and stopping a vehicle with the above control apparatus, it is unnecessary to cautiously move the pedal 15 through its various stages, in fact, an operator may step on the pedal and move it to its lowermost position and all of the above described operations involved in bringing the vehicle into motion will progressively occur in a predetermined sequence. The same is true in stopping the vehicle. It is merely necessary to quickly release the pedal 15 and allow it to return to its uppermost position in order to close the throttle, disengage the clutch and apply the brakes rapidly in the sequence recited.

My improved vehicle control apparatus may be employed on a vehicle having conventional controlling means and it may be readily rendered inoperative by disconnecting the main vacuum line from the manifold and fixing the pedal 15 in its initially depressed position so as to permit the vehicle to be driven in the conventional manner.

Although but one specific embodiment of this invention has herein been shown and described, it will be understood that various changes in the size, shape and arrangement of parts may be made without departing from the spirit of my invention and it is not my intention to limit its scope other than by the terms of the appended claims.

What I claim is:

1. In combination a plurality of control mechanisms including clutch, brake and fuel feeding mechanisms; actuating apparatus for each of said control mechanisms respectively including an operating member; and means for releasably locking said brake mechanism in an applied position when said operating member is in a predetermined position.

2. In a vehicle including an internal combustion engine and having brake and clutch devices, pneumatic actuating apparatus for said brake and clutch devices communicating with a part of said engine having sub-atmospheric pressure, and operable by the suction of said engine control mechanism for said actuating apparatus including a single operating member, means for releasably holding said operating member in its normal brake applying and clutch disengaging position, and an element operable by said member for releasably holding said brake device in an applied condition independently of the suction of said engine when said operating member is in its normal position.

3. In combination, a plurality of control mechanisms including clutch and brake mechanisms; actuating apparatus for each of said control mechanisms, respectively, including an operating member, and means for releasably locking said brake mechanism in an applied position when said operating member is in a predetermined position, said means being releasable by manipulation of said operating member.

4. In combination, a plurality of control mechanisms, actuating devices for each of said mechanisms, respectively, including an operating member, and means for releasably locking one of said mechanisms in a predetermined position when said operating member is in a predetermined position.

5. In combination, a plurality of control mechanisms including clutch and brake mechanisms, a pneumatic device for actuating each of said mechanisms respectively, a single operating member for controlling each of said actuating devices, and means for releasably holding said brake mechanism in an applied position independently of said pneumatic actuating device, said means being releasable by manipulation of said operating lever.

6. In a vehicle including an engine, clutch mechanism, a brake system and fuel feeding apparatus having a variable throttle valve; fluid pressure actuating devices for said clutch and said brake system respectively, each having a control valve; a manual operating member; means for connecting said throttle valve and the control valves of said fluid pressure actuating devices with said operating member, said means being constructed and arranged in such a manner as to close said throttle, energize said clutch actuating device so as to disengage said clutch and to thereafter energize the actuating device of said brake system so as to apply the latter during movement of said operating member in one direction; means for returning said operating member to its initial position; a locking member for releasably maintaining said brake system in an applied state after such return movement of said operating member; and mechanism operable when the brake system is applied for releasing said locking member during the next succeeding movement of said operating member in said first mentioned direction.

7. In a vehicle including an engine, fuel feeding means having a variable throttle valve, clutch mechanism and brake mechanism; actuating devices for said clutch mechanism and brake system respectively, each having a variable control element; a manual operating member; means connecting said operating member with said throttle valve, clutch mechanism and brake system, said means being constructed and arranged in such a manner as to progressively release said brake system, engage said clutch mechanism and open said throttle valve in the sequence recited when said operating member is moved in one direction and to progressively close said throttle valve, deenergize said clutch actuating device, and apply said brake system when said operating member is moved in an opposite direction; a locking member for releasably retaining said brake system in an applied state after movement of said operating member in said last mentioned direction; and mechanism operable when said brake system is applied for releasing said locking member during the next successive movement of said operating member in said first mentioned direction.

8. In a vehicle including clutch mechanism and a braking system; actuating devices for said clutch mechanism and braking system respectively; an operating member for controlling said devices; means connecting said operating member with each of said actuating devices respectively, said means being constructed and arranged in such a manner as to release said braking system and engage said clutch mechanism thereafter when said operating member is moved in one direction, and to disengage said clutch and apply said braking system thereafter when said operating member is moved in an opposite direction, a locking member for releasably retaining said brake system in an applied state independently of said brake system control member; and mechanism operable by said operating member during the next successive movement of said operating member in said first mentioned direction.

9. The combination of an automobile having a driving engine, brake and clutch, a rockshaft having an actuating lever, said brake having a power cylinder for actuating the same and having engine valve connections to the said rockshaft to control the same, said clutch having a power cylinder connection for releasing the same and having engine valve connections to said rockshaft, and a throttle for the driving engine having connections to the said rockshaft to control the same, the said connections being timed whereby the depression of the said lever operates the brake cylinder and completely releases the brake, then actuates the clutch power means to let in the clutch, and then operates the throttle to accelerate the engine and on the reverse action closes the throttle or accelerator, throws out the clutch, permits free wheeling, and applies the brake.

10. The combination of an automobile having a driving engine, brake and clutch, a rockshaft having an actuating lever, said brake having a power cylinder for actuating the same and having engine valve connections to the said rockshaft to control the same, said clutch having a power cylinder connection for releasing the same and having engine valve connections to said rockshaft, and a throttle for the driving engine having connections to the said rockshaft to control the same, the said connections being timed whereby the depression of the said lever operates the brake cylinder and completely releases the brake, then actuates the clutch power means to let in the clutch, and then operates the throttle to accelerate the engine and on the reverse action closes the throttle or accelerator, throws out the clutch, and permits free wheeling.

11. The combination of an automobile having a driving engine, brake, clutch and throttle, said brake and clutch having power cylinder means for operation thereof, and a lever connected and adapted upon depression thereof to one position to throw in the clutch and then at a further depression to operate the throttle to accelerate the engine and on the reverse action to close the throttle and then to throw out the clutch, whereby the automobile may coast with the clutch disengaged, and on further release to apply the brake.

12. Control mechanism for an automotive vehicle having a throttle, a clutch and a brake, said means including an accelerator pedal and means interconnecting said throttle, clutch, brake and pedal, said means including separate power actuators for the clutch and brake and control valves for each of said actuators and linkage for operating the throttle, said interconnecting means being adapted to successively close the throttle, release the clutch and apply the brake as the pedal is released, and reversely release the brake, engage the clutch and open the throttle as the pedal is applied.

13. In an automotive vehicle provided with a throttle, a clutch and a brake, power means for operating the clutch, a separate power means for operating the brake, force transmitting linkage for operating the throttle, an accelerator pedal connected to said linkage and means interconnecting said linkage and power means, said parts being so constructed and arranged as to successively and intermittently close the throttle, release the clutch and apply the brake as the pedal is released.

14. In an automotive vehicle provided with a throttle, a clutch and a brake, vacuum operated power means for operating the clutch, a separate vacuum operated power means for operating the brake, force transmitting linkage for operating the throttle, an accelerator pedal connected to said linkage and means interconnecting said linkage and power means, said parts being so constructed and arranged as to successively and intermittently close the throttle, release the clutch and apply the brake as the pedal is released.

15. In an automotive vehicle provided with a throttle, a clutch, a brake and an accelerator pedal, a fluid motor for operating the brake, a second fluid motor for operating the clutch, control valves for each of said motors and means interconnecting the throttle, pedal and valves, said means comprising lost motion or slip joint structure to effect a sequential operation of the throttle, clutch and brake upon releasing the accelerator pedal and a sequential operation of the brake, clutch and throttle upon applying pressure on said accelerator pedal.

16. In an automotive vehicle provided with an internal-combustion engine having an intake manifold, a throttle, a clutch and a brake, a vacuum operated motor for operating the clutch and a second vacuum operated motor for operating the brake, an operative connection between said clutch motor and clutch and an operative connection between said brake motor and brake, fluid transmitting connections between said motors and the intake manifold at a point between the pistons of the internal-combustion engine and the carburetor, valve means for controlling the aforementioned fluid transmitting connections, and a common manually operable means for operating said throttle and valve means.

17. In an automotive vehicle provided with an internal-combustion engine having an intake manifold, a throttle, a clutch, a brake and an accelerator pedal, a vacuum operated motor for operating the clutch and a second vacuum operated motor for operating the brake, and operative connection between said clutch motor and clutch and a second operative connection between said brake motor and brake, fluid transmitting connections between said motors and the intake manifold at a point between the pistons of the internal-combustion engine and the carburetor thereof, valve means for controlling the aforementioned fluid transmitting connections, and linkage interconnecting said throttle and valve means, said linkage including lost motion connections with the throttle and valve means, the parts being so constructed as to insure a successive and intermittent operation of the throttle, clutch and brake in one direction of movement of the accelerator pedal and a successive and intermittent operation of the brake, clutch and throttle in the other direction of movement of the accelerator pedal.

BENJAMIN F. WRIGHT.